(12) United States Patent
Curtis

(10) Patent No.: US 7,191,607 B2
(45) Date of Patent: Mar. 20, 2007

(54) AIR CONDITIONING SYSTEM WITH MOISTURE CONTROL

(76) Inventor: Morton Curtis, 10909 FM 2447, E., Chappell Hill, TX (US) 77426

( * ) Notice: Subject to any disclaimer, the term of this patent is extended or adjusted under 35 U.S.C. 154(b) by 0 days.

(21) Appl. No.: 10/691,087

(22) Filed: Oct. 22, 2003

(65) Prior Publication Data

US 2004/0140364 A1    Jul. 22, 2004

Related U.S. Application Data

(60) Provisional application No. 60/420,523, filed on Oct. 23, 2002.

(51) Int. Cl.
*F25D 17/04*    (2006.01)
*G05B 5/00*     (2006.01)

(52) U.S. Cl. .................. 62/186; 62/215; 318/471; 318/268

(58) Field of Classification Search .......... 62/186, 62/176.1, 89, 215; 237/12; 236/44 C, 44 A, 236/46 R; 165/200, 201, 222; 318/471, 318/268, 254, 432
See application file for complete search history.

(56) References Cited

U.S. PATENT DOCUMENTS

| | | | |
|---|---|---|---|
| 3,915,376 A | 10/1975 | Attridge, Jr. et al. | 236/44 |
| 3,970,246 A | 7/1976 | Attridge, Jr. et al. | 236/44 |
| 4,210,278 A * | 7/1980 | Obler | 236/49.3 |
| 4,389,853 A * | 6/1983 | Hile | 62/89 |
| 4,757,694 A * | 7/1988 | Espinosa | 62/175 |
| 5,303,561 A * | 4/1994 | Bahel et al. | 62/186 |
| 5,592,059 A * | 1/1997 | Archer | 318/254 |
| 5,881,806 A | 3/1999 | Rudd | 165/244 |
| 6,070,660 A * | 6/2000 | Byrnes et al. | 165/244 |
| 6,282,910 B1* | 9/2001 | Helt | 62/229 |
| 6,415,617 B1 | 7/2002 | Seem | 62/186 |
| 6,427,461 B1 | 8/2002 | Whinery et al. | 62/176.6 |
| 2002/0090908 A1 | 7/2002 | Estepp | 454/236 |
| 2002/0124992 A1 | 9/2002 | Rainer et al. | 165/11.1 |

* cited by examiner

*Primary Examiner*—Chen Wen Jiang
(74) *Attorney, Agent, or Firm*—Madan, Mossman & Sriram, P.C.

(57) ABSTRACT

Devices and methods for moisture removal from conditioned air. A speed control is provided that selectively operates the blower motor of an air conditioning system at a lower speed. The speed control may include a time delay circuit and single pole, double throw relay. The speed control is used to slow the speed of the air cycler during the initial stage of a cooling cycle. This initial stage is typically the first 5–7 minutes of the air conditioning cycle. In a further aspect, a humidistat is operably associated with the system for detection of humidity levels within the air of a home or other structure. The system is programmed to close the motorized outside air damper in the event that humidity levels exceed a predetermined level, thereby limiting further entry of humid outside air into the home.

20 Claims, 4 Drawing Sheets

AIR CONDITIONING SYSTEM WITH MOISTURE CONTROL

This application claims the priority of U.S. provisional patent application Ser. No. 60/420,523 filed on Oct. 23, 2002.

BACKGROUND OF THE INVENTION

1. Field of the Invention

The invention relates generally to air conditioning systems and, in particular aspects, to devices and methods for controlling humidity during air conditioning cycles.

2. Description of the Related Art

Indoor air quality has become a significant concern, particularly for homes, but also for office buildings where workers spend much of their day. There are some concerns that poorly ventilated indoor spaces permit contaminants in the interior air to become concentrated as the air is recirculated. One part of this perceived problem is that of toxic mold.

Air conditioning serves two basic purposes. The first is the removal of heat from the air within the home or other structure. The second function is the removal of moisture, or humidity, in the air. In order to effectively remove humidity, the air conditioner must run long enough for the evaporator coil to become cold enough to remove moisture from the conditioned air. The inventor has recognized that the typical run time must be between 7–10 minutes before this moisture removal process begins.

The problems related to poor indoor air quality may be increased in newer homes, which have sought to become more energy efficient. Newer homes typically feature tighter overall construction, meaning that they permit less fresh air to permeate the structure of the home. Windows and doors, for example, are provided with tighter seals. In addition, many newer homes are provided with "low emittance" windows that provide a fluid barrier between two panes of glass. Less heat is transmitted through these windows. The tightness of the structure and the windows effectively reduces the amount of air conditioning or heating required to maintain a desired temperature within the home. However, these measures also lead to more "stale air" in the home and may exacerbate indoor air quality problems. Because the home (or other structure) permits less heat and outdoor air to enter the home naturally, a shorter air conditioning run time is required to maintain the desired temperature within the home. As a result, moisture is not effectively removed from the air.

Standards have been developed recently that require the introduction of fresh outside air in conjunction with the typical air conditioning cycle of a home. ASHRAE Standard 62-89, "Ventilation for Acceptable Indoor Air Quality," which is incorporated into many building codes, recommends that the relative humidity of homes be maintained between 30 and 60 percent in order to minimize the growth of allergenic and pathogenic organisms. As a result, the air conditioning system for many new homes incorporates a motorized "outside air" damper that selectively introduces outside air into the system. An air cycle timer operates the motorized damper and indoor blower so that outside air is introduced according to a predetermined time schedule. Often, the outside air damper will introduce extremely humid air into the home, raising the humidity level above the 60% level recommended by the current ASHRAE standard.

The inventor has recognized that, during the initial portion of the cooling cycle, very warm and humid air is also introduced into the home even via closed air conditioning systems. The plenum, duct work and, often, the blower, is typically located in the attic of a home and, thus, are subjected to hot summertime temperatures. It is not uncommon for the air introduced into the home in the initial stages of the initial portion of the cooling cycle to be around 130 degrees F. This initial injection of warm and humid air significantly increases the temperature and humidity in the air within the home during the start of an air conditioning cycle. If the air conditioning cycle is short, it does not effectively remove the humidity.

Some techniques have been developed for removing moisture from indoor air. Unfortunately, these techniques are expensive and largely ineffective. Newer furnaces/air handlers, for instance, have been developed that are provided with special motors that can adjust motor speed by varying voltage to the motor. The speed control for these units is provided by way of predetermined logic via printed circuit boards within the control system of the unit. These "variable speed furnaces" require a specialized D/C motor, are quite expensive as are replacement motors for them. The variable speed furnaces have additional features that can create problems if not accommodated in the design of the air conditioning system. Additionally, it is pointed out that these variable speed units are limited in reducing the blower speed sufficiently to be able to effectively remove moisture. Most such units limit the lower end of blower speed to approximately 80% of the blower's full speed, which does not accelerate dehumidification in the cycle significantly. Additionally, D/C motors have difficulty withstanding A/C voltage drops and surges. This leads to a higher failure rate than for furnaces that incorporate A/C motors.

U.S. Pat. No. 6,431,268 issued to Rudd describes a system for controlling operation of an air conditioning system wherein a controller ("air cycler timer") operates an outside air damper. With Rudd's device, the damper is opened and the air distribution fan is energized on a timed on and off cycle. If the air distribution fan is already in operation due to a cooling demand from the thermostat, Rudd's air cycler will energize only the damper for a preset timed period. Rudd's system does not positively control the outside air damper with respect to humidity level and does not independently, or as a byproduct of operation, have any effect on dehumidification.

U.S. Pat. No. 6,223,543 issued to Sandelman describes an air conditioning system that incorporates a fan speed controller that is connected to the system fan to variably control the speed of the fan. Sandelman's system measures dry bulb temperature and moisture levels and then adjusts the fan speed based upon those measurements. Sandelman's system does not reliably provide for reduced speed operation of the blower during initial portions of the blower cycle. Also, the system is relatively complex since it relies upon temperature and moisture sensing to operate and utilizes a programmed controller. In practice, Sandelman's system also requires a specialized variable speed motor so that the fan speed can be controlled. This type of motor is expensive. This complexity also makes the system difficult to troubleshoot and somewhat costly.

U.S. Patent Application Publication No. U.S. 2002/0124992 A1 by Rainer et al. describes an integrated ventilation cooling system that incorporates an electronically commutated, variable speed motor, or "ECM," for control of the blower fan. As Rainer admits, ECMs do not provide a significant speed reduction (only around 20% variance in airflow). Additionally, ECMs are specialized equipment and costly. Operation of the ECM in Rainer's arrangement is tied directly to the difference between the actual indoor temperature and the desired temperature. When the difference is great, the ECM causes the blower to operate at a greater speed. When the difference is less, the ECM causes the blower to operate at a lower speed. Thus, fan speed is based entirely upon temperature and not humidity levels.

There is a need to provide improved methods and devices for removal of moisture from indoor air. The present invention addresses the problems of the prior art.

SUMMARY OF THE INVENTION

The invention provides devices and methods for effective moisture removal from conditioned air. In one aspect, the invention provides a speed control that selectively operates the air blower at a lower speed utilizing the conventional multi-speed motor provided by most manufacturers. In a described embodiment, the speed control comprises a time delay circuit and single pole, double throw relay. The speed control is used to slow the speed of the air cycler during the initial stage of a cooling cycle. This initial stage is typically the first 7–10 minutes of the air conditioning cycle.

In a further aspect, the invention provides a humidistat operably associated with the system for detection of humidity levels within the air of the home. The system is set to close the motorized outside air damper in the event that humidity levels exceed a predetermined level, thereby limiting further entry of humid outside air into the home.

It is an object of the present invention to accelerate dehumidification during a normal air conditioning cycle to prevent buildup of humidity levels within a home, or other structure, that the air conditioning system cannot easily remove.

It is also an object of the invention to provide an effective, inexpensive, and relatively simple means for controlling and reducing the humidity levels in homes and other structures.

It is also an object of the present invention to provide devices and methods that may be utilized in new construction as well as to retrofit existing systems easily and inexpensively.

DETAILED DESCRIPTION OF THE PREFERRED EMBODIMENTS

Figure 1:
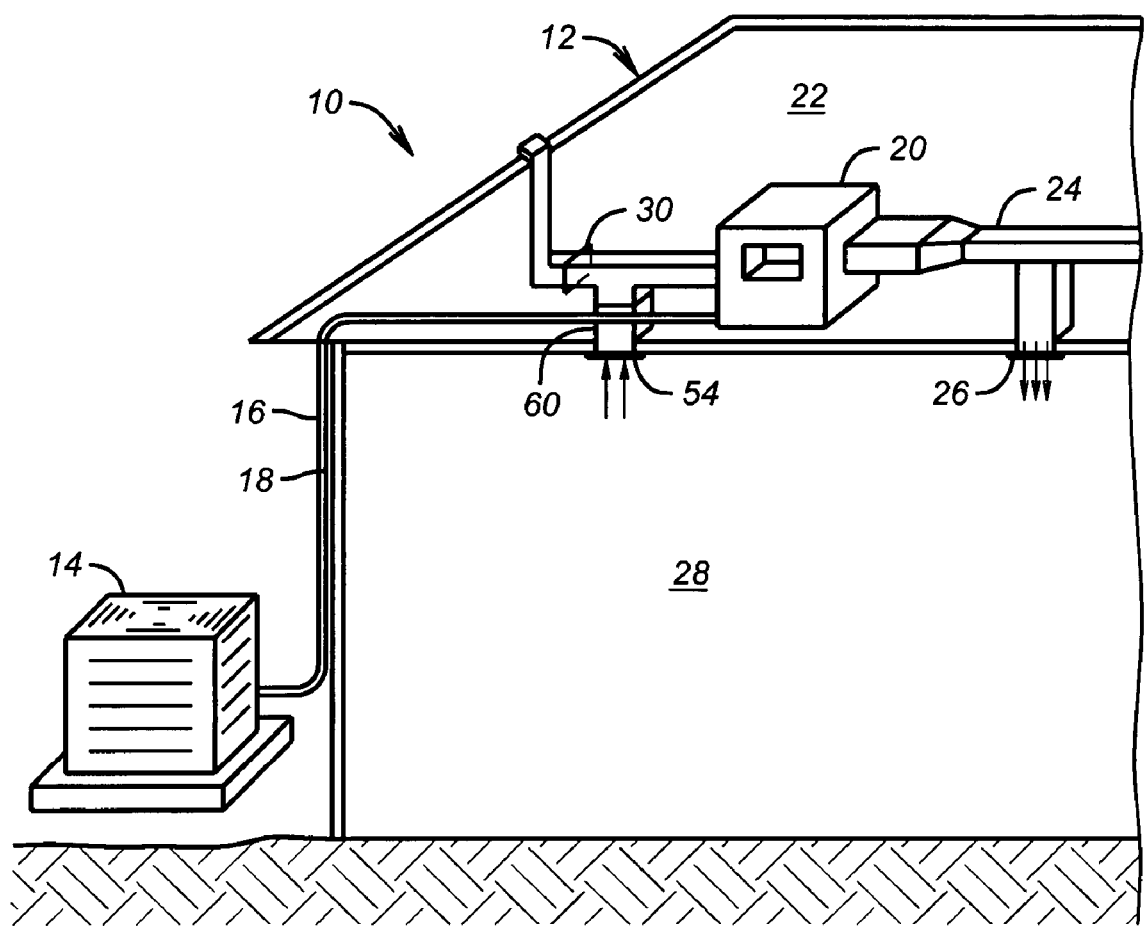
FIG. 1 is an overall schematic view of an exemplary air conditioning system used in conditioning the air of a home.

Referring first to FIG. 1, there is shown an exemplary air conditioning system 10 that is used for cooling of a home 12. The air conditioning system 10 includes a condensing unit 14 that is located outside of the home 12. Fluid conduits 16, 18 interconnect the condensing unit 14 with a furnace/air handler/evaporator unit 20 that is located in the attic space 22 of the home 12. Ductwork 24 extends from the furnace/air handler/evaporator 20 to a number of vents 26 (one shown) that permit conditioned air to flow into the occupied portions 28 of the home 12. A motorized outside air damper 30 is incorporated into the return air ductwork 60. The air damper 30 is a known device that may be selectively opened and closed to admit outside air into the return air ductwork 60.

Figure 2:
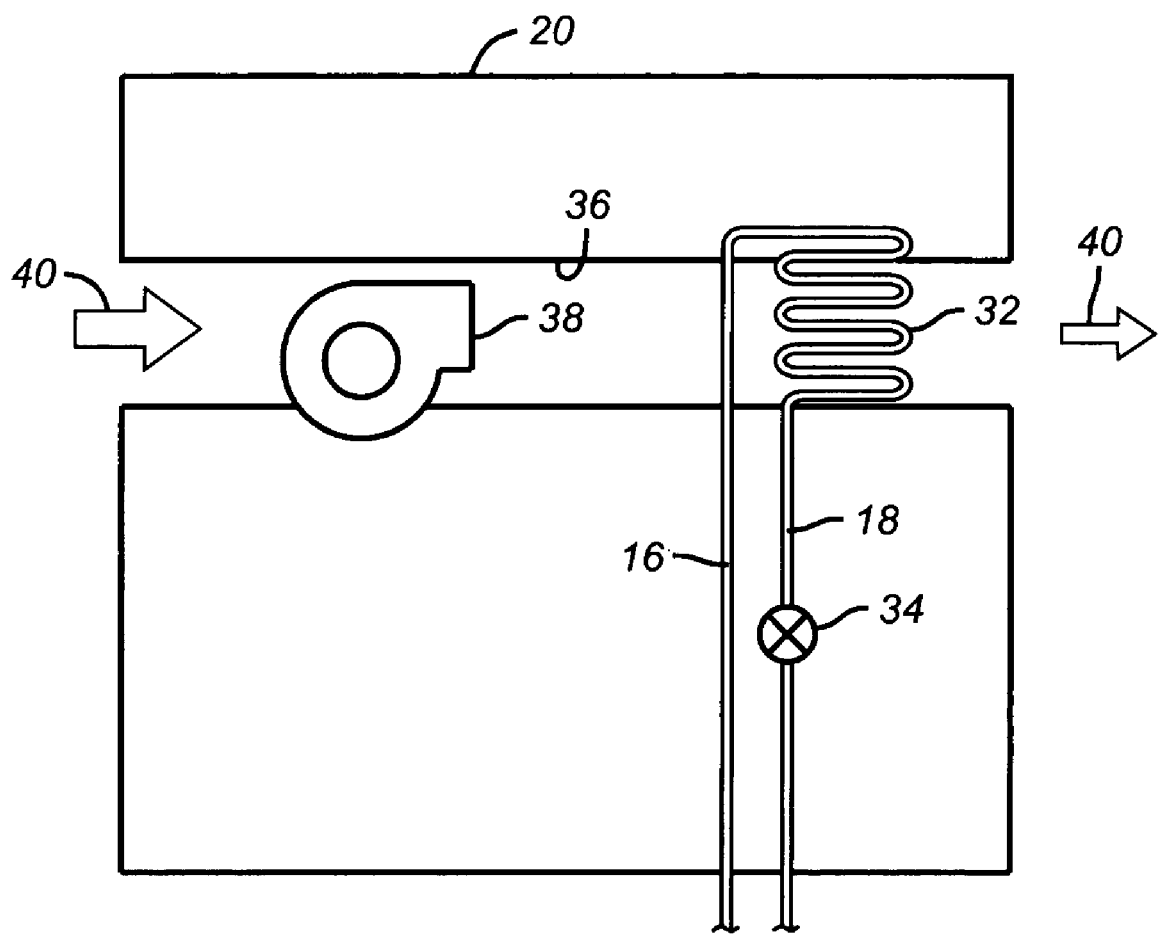
FIG. 2 is a diagram of components associated with the furnace/air handler of the air conditioning system.

FIG. 2 is a schematic illustration of components associated primarily with the furnace/air handler/evaporator unit 20 of the air conditioning system 10. As may be seen, the furnace/air handler/evaporator 20 includes an evaporator coil 32 that is filled with a refrigerant fluid that is circulated to the coil 32 by fluid conduits 16, 18. Refrigerant passes through expansion valve 34 and then is circulated through the evaporator coil 32 via air passage 36 by blower 38, wherein the dehumidification process is accomplished. Refrigerant then passes to the outdoors and is compressed and condensed by the condensing unit 14 while indoor heat is rejected from the refrigerant. The process is then repeated. Arrows 40 illustrate the direction of air flow. Other features of the furnace/air handler/evaporator 20 and air conditioning systems generally, such as the use of heat exchangers, compressors, and so forth, are well known in the art and, therefore, will not be described in any detail herein.

Figure 3:
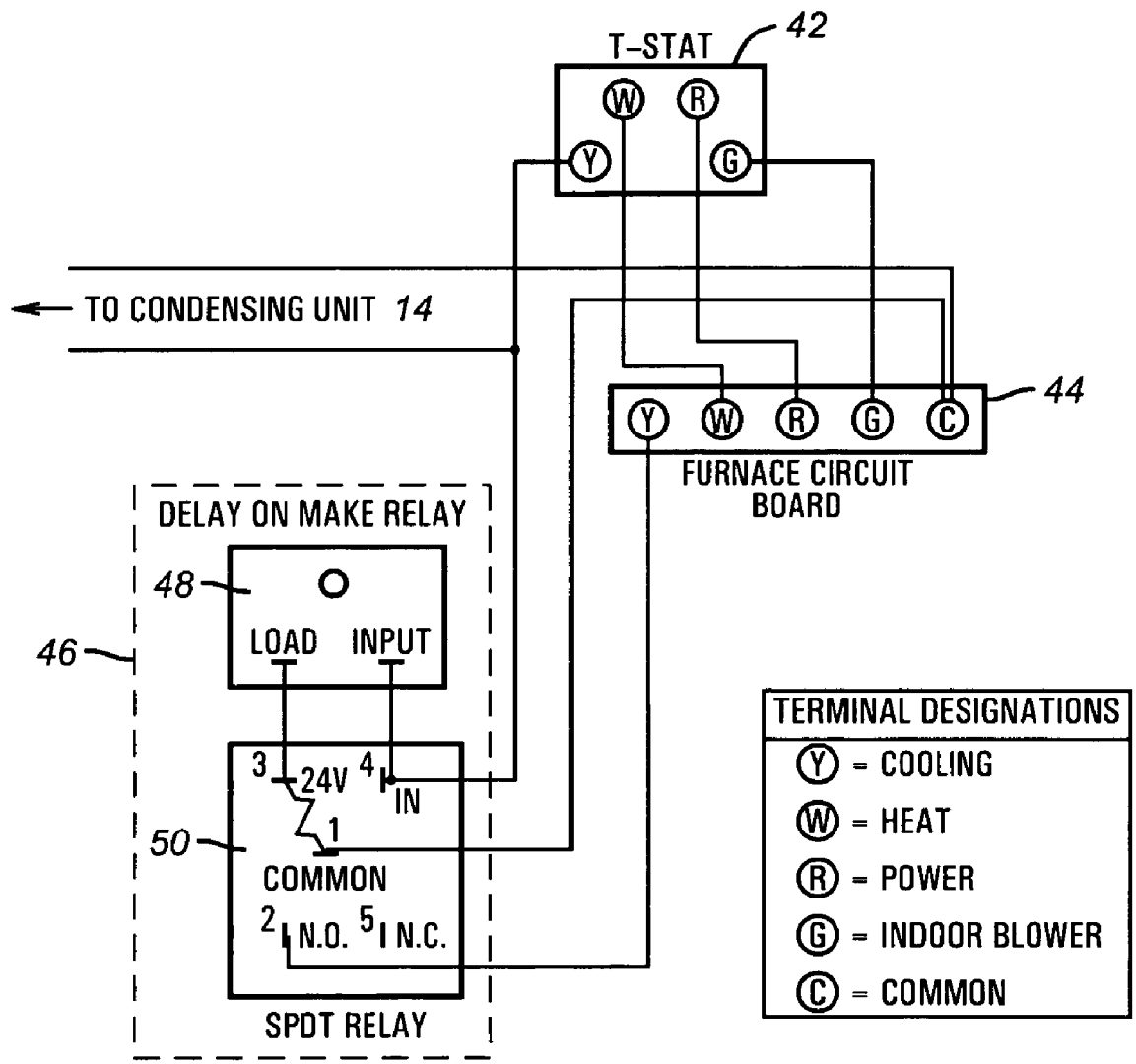
FIG. 3 is a wiring diagram for components associated with the exemplary air conditioning system shown in FIGS. 1 and 2.
Figure 4:
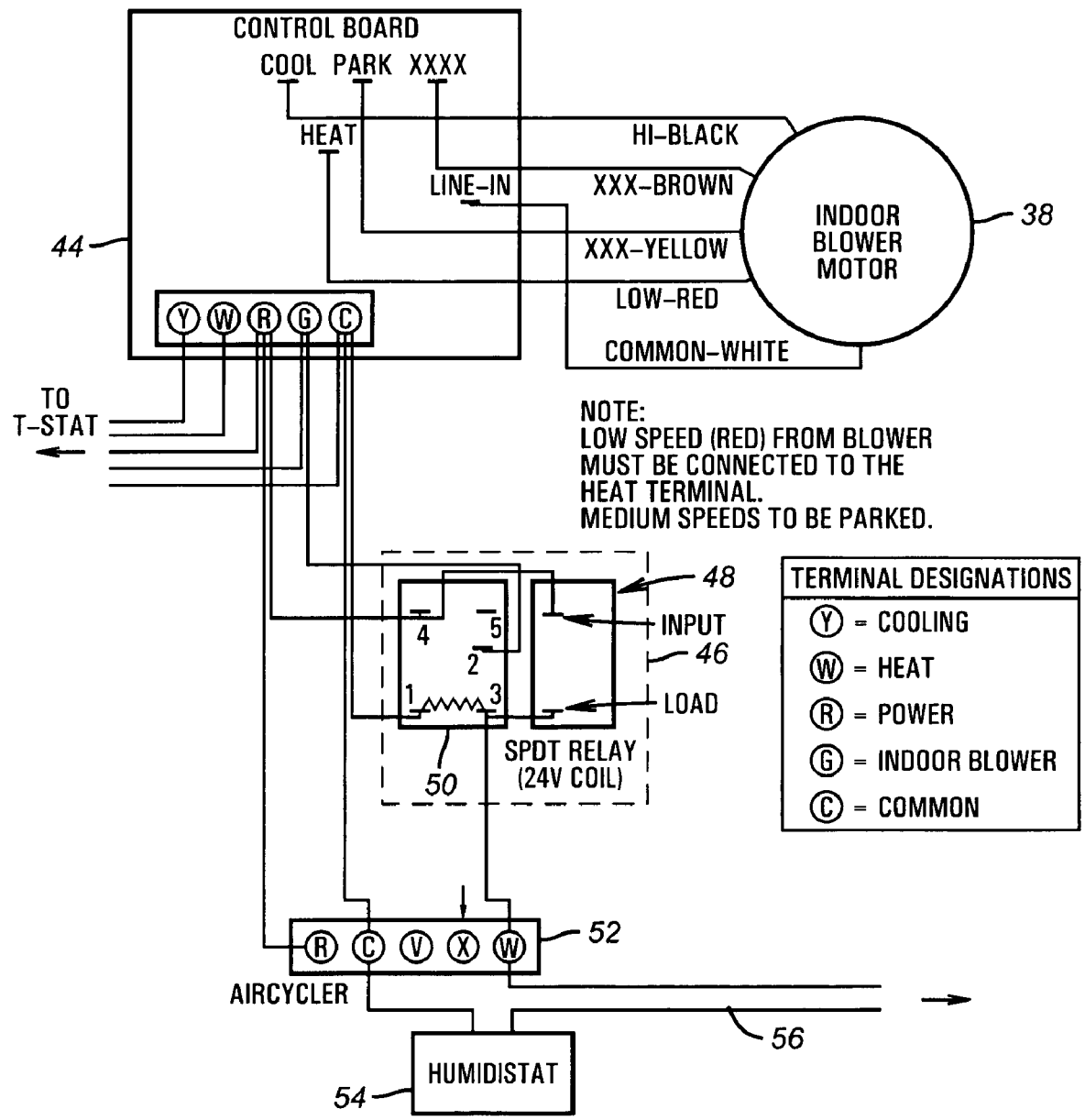
FIG. 4 is a wiring diagram for components associated with the exemplary air conditioning system shown in FIGS. 1 and 2.

FIGS. 3 and 4 depict the operational association of a thermostat, humidistat, and other control devices with the system 10 for operational control of the system 10. FIG. 3 illustrates a thermostat 42 that is interconnected for control of the heating and cooling cycles of the system 10. As is known, the thermostat 42 is typically located within the living space 28 of the home and is wired to the furnace circuit board 44 for control of cooling, heating, power and the blower 38. Both the thermostat 42 and the furnace circuit board 44 are electrically interconnected with a speed controller 46. The speed controller 46 includes a time delay relay, or circuit, 48 and a single pole, double throw (SPDT) relay 50.

FIG. 4 depicts further wiring details for an exemplary air conditioning system 10. It should be pointed out the system portions depicted in FIG. 4 are provided for use in drawing fresh air from outside of the home 12 to mix with air inside of the home 12. Those of skill in the art will understand that, for older air conditioning systems, which do not incorporate fresh air entry systems, certain components shown in FIG. 4 will not be present. These include the outside air damper control line 56, air cycler 52 and humidistat 54.

The SPDT relay 50 and control board 44 are configured to permit the SPDT relay 50 to switch the blower motor 38 between three operational modes: 1) off, 2) a first, lower speed operation, and 3) a second, higher speed operation. The SPDT relay 50 is further shown in FIG. 4 to be interconnected for control of the air cycler 52 used for cycling outdoor air brought in through outdoor air damper 30. A humidistat 54 is operably interconnected with both the motorized damper 30 (via control line 56) and with air cycler 52. Humidistat 54 is a known device that is capable of detecting humidity levels in air and is typically used to turn on a humidifier when humidity levels fall below a predetermined point.

During operation, the speed controller 46 and humidity control are provided by the humidistat 54. A speed controller 46 constructed in accordance with the present invention has been shown to reduce blower speed to approximately 70% of full speed, significantly lower than is possible with newer "variable speed" furnaces that rely upon voltage variance. The time delay circuit 48 is programmed so that the speed controller 46 runs the blower 38 at a first, lower speed for a predetermined "delay" period once the blower 38 is first turned on at the beginning of an air conditioning cycle. When the delay period elapses, the blower 38 is run at the second, higher speed for the remainder of the cycle. The delay period is typically 5–10 minutes and, more preferably, from 5–7 minutes. However, the delay period may be increased or decreased depending upon the size and moisture level requirements of the home. Thus, it is highly preferred that the time delay circuit 48 be programmable or at least adjustable. Running the blower 38 at the lower speed increases moisture removal since the air is flowed past the cooling coil 32 more slowly and permitted contact with the coil 32 for a longer period of time.

The humidistat 54 detects the humidity level of air inside the living space 28 of home 12 during operation of the air conditioning system 10. As noted previously, humidity levels inside the home 12 may rise and fall during operation of the usual heating or air conditioning cycle as well as by result of doors or windows being opened and closed in the home 12. However, by virtue of the control association with the outside air damper 30, the damper 30 is closed by the furnace circuit board 44 when the humidistat 54 detects humidity levels within the home 12 that exceed the predetermined level (i.e., 60%). Specifically, the damper 30 is closed when the circuit board 44 opens the circuit to the damper 30. As a result, further entry of humid air into the home 12 through the outside air damper 30 is prevented. It is noted that the humidistat 54 is preferably embedded in the return air ductwork (60 in FIG. 1) of the home 12. This placement is preferred since it permits the humidistat 54 to read well-mixed, combined air rather than air from an isolated location. The humidistat 54 also controls operation of the air cycler 52 to mix outside air entering through the outside air damper 30 with air already within the interior space 28 of the home 12.

The systems and methods of the present invention are applicable to newer homes that incorporate outside air dampers. However, the blower speed control techniques may be applied to older homes to effectively reduce air moisture levels. The controls and components associated with the present invention may also be retrofitted into existing air conditioning systems. For example, the speed control components can be mounted inside of a sheet metal control box and affixed to the casings of the furnace/air handler of an existing air conditioning system.

The use of the blower speed control in conjunction with the control of the outdoor air damper humidity control creates an effective system for controlling the humidity levels in a home.

Those of skill in the art will recognize that numerous modifications and changes may be the exemplary designs and embodiments described herein and that the invention is limited the claims that follow and any equivalents thereof.

What is claimed is:

1. An air conditioning system, comprising:
an air handler containing an AC blower motor for movement of air past a cooling coil; and a speed control adapted to accelerate the removal of moisture within the air being conditioned, the speed control including a time delay circuit and relay that:
(i) operate only the blower motor of the air handler at a first speed for a delay period when the cooling coil is energized and then operating the blower motor at a second speed that is higher than the first speed without varying a voltage applied to the blower motor, the difference between the first speed and the second speed being selected such that more moisture is removed from within the air being conditioned at the first speed than at the second speed; and (ii) operate the blower at the first speed during every cooling cycle.

2. The air conditioning system of claim 1 wherein the time delay circuit is adjustable.

3. The air conditioning system of claim 2 wherein the first speed is substantially fixed.

4. The air conditioning system of claim 2 wherein the time delay circuit causes the blower motor to operate at the first speed for the delay period at the start of a cooling cycle.

5. The air conditioning system of claim 4 wherein the delay period is adjustable from about 5 minutes to about 10 minutes.

6. The air conditioning system of claim 1 further comprising: an outside air damper for selective introduction of outside air into the air conditioning system; and a humidistat for operational control of the outside air damper to close the outside air damper upon detection of an excessive humidity level in the air being conditioned;.

7. The air conditioning system of claim 6 further comprising return air ductwork for carrying conditioned air from the structure back into the air conditioning system, and wherein the humidistat is mounted within the return air ductwork.

8. The air conditioning system of claim 1 wherein the relay is a single pole, double-throw relay for switching the fan blower from the first speed to the second speed.

9. The air conditioning system of claim 1 wherein speed control is interconnected with a preexisting furnace circuit board, the speed control and furnace circuit board being configured to operate the blower motor.

10. A method of conditioning air within a structure comprising:
energizing a cooling coil;
accelerating the removal of moisture from the air by operating only an AC blower motor at a first speed for a predetermined time period to move air past the cooling coil;
operating only the blower motor at a second speed after said predetermined time period has elapsed to move air past the cooling coil, the second speed being greater than the first speed, the difference between the first speed and the second speed being selected such that more moisture is removed at the first speed than at the second speed and the difference substantially prevents moisture from building up in the structure, the speed being controlled by a time delay circuit and relay;
operating the blower at the first speed during each cooling cycle;
changing a speed of the blower motor without varying a voltage applied to the blower motor.

11. The method of claim 10 further comprising the steps of: detecting a humidity level within conditioned air; and limiting entry of outside air into the conditioned air by closing off an outside air damper upon detection of a predetermined humidity level.

12. The method of claim 10 wherein the predetermined time period is from about 5 minutes to about 7 minutes.

13. The method of claim 10 wherein the first speed is substantially fixed.

14. The method of claim 10 further comprising adjusting the predetermined delay period.

15. The method of claim 10 further comprising selectively introducing outside air into the air conditioning system using an outside air damper.

16. A control unit for controlling an air conditioning system having a condensing unit having cooling coils, an air handler having an AC blower motor for blowing air across the cooling coils, the control unit comprising: a control circuit configured to control the speed of only the blower motor and a time delay circuit and relay, the control circuit being further configured to operate the blower motor at a first speed for a predetermined period, and then operate the blower motor at a second speed greater than the first speed without varying a voltage applied to the blower motor, the difference between the first speed and the second speed being selected such that more moisture is removed at the first speed than at the second speed, the control circuit operating the blower motor and the first speed during each cooling cycle.

17. The control unit of claim 16 wherein the first speed is substantially fixed.

18. The control unit of claim 17 further comprising a humidistat mounted within a return air ductwork that measures the amount of moisture in the air being conditioned.

19. The control unit of claim 17 wherein the control circuit is configured to introduce outside air into the air conditioning system by operating an outside air damper.

20. The control unit of claim 16 further comprising a time delay circuit for controlling the delay period and a single pole, double-throw relay for switching the fan blower from the first speed to the second speed.

* * * * *